United States Patent [19]

Matsui et al.

[11] Patent Number: 4,763,884
[45] Date of Patent: Aug. 16, 1988

[54] APPARATUS FOR SUPPORTING A VIBRATING OBJECT

[75] Inventors: Shinichi Matsui, Yokosuka; Masaru Sugino, Fujisawa, both of Japan

[73] Assignee: Nissan Motor Company, Limited, Yokohama, Japan

[21] Appl. No.: 931,188

[22] Filed: Nov. 17, 1986

[30] Foreign Application Priority Data

Nov. 28, 1985 [JP] Japan .......................... 60-183876[U]

[51] Int. Cl.$^4$ .............................................. F16F 3/00
[52] U.S. Cl. ................................. 267/140.1; 267/121
[58] Field of Search ................. 248/562; 267/35, 118, 267/121, 136, 140.1; 188/285; 11/9

[56] References Cited

U.S. PATENT DOCUMENTS 4,588,174 5/1986 Konishi ........................... 267/140.1
4,667,942 5/1987 Bitschkus et al. ................ 267/140.1

FOREIGN PATENT DOCUMENTS 60-113836 6/1985 Japan .
0179542 9/1985 Japan ............................... 267/140.1

Primary Examiner—Duane A. Reger
Attorney, Agent, or Firm—Foley & Lardner, Schwartz, Jeffery, Schwaab, Mack, Blumenthal & Evans

[57] ABSTRACT

An apparatus for supporting a vibrating object (, e.g., a power unit of a vehicle) which can reduce a plurality of vibrations transmitted therethrough by changing the resonant frequency of a dynamic fluid damper constituted by the apparatus according to a frequency change of the vibrations. The apparatus comprises: (a) a first fluid chamber located on the vibrating object and having at least one elastic wall thereof; (b) a second fluid chamber located on another object and having at least one elastic wall thereof; (c) a partitioning member disposed between the first and second fluid chambers; (d) a plurality of communication passages disposed through the partitioning member in parallel with each other for communicating the first and second chambers; and (e) communication passage open/close envelope which opens or close at least one of the communication passages according to a difference between vibration amplitudes of vibrations transmitted thereinto, whereby a plurality of vibrations transmitted through the apparatus are suppressed.

15 Claims, 3 Drawing Sheets

APPARATUS FOR SUPPORTING A VIBRATING OBJECT

BACKGROUND OF THE INVENTION

1. Field of the Invention

The present invention relates to an apparatus for supporting a vibrating object applicable but not exclusively to an apparatus for supporting a power unit (, e.g., engine) of an automotive vehicle which effectively reduces various vibrations transmitted through the apparatus and mainly caused by the power unit.

2. Description of the Prior Art

Conventional apparata for supporting vibrating objects such as power units of automotive vehicles are exemplified by a Japanese Patent Application Unexamined Open No. Sho 60-113836 published on June 20, 1985.

The above-identified Japanese Patent Application document discloses a fluid sealed mount having a structure such that an elastic object is intervened between an inner cylindrical member and an outer cylindrical member disposed outside the inner cylindrical member and a first fluid chamber and second fluid chamber, in both of which a noncompressible fluid is filled and between both of which the noncompressible fluid can mutually be moved, are formed on the elastic object.

Furthermore, a plurality of communication passages are installed in the fluid sealed mount for communicating the above-described first fluid chamber and second chamber and valve means is also installed which is capable of switching between two states, one state being a state in which at least one of the plurality of communication passages is closed and the other state being a state in which the communication passage is not closed (open) and which is operated to switch from the above-described open state to the above-described close state by means of a communication action of the above-described noncompressible fluid.

However, since in such a conventional vibrating object supporting apparatus as described above vibrations mainly caused by the vibrating object are absorbed essentially by means of the elastic object when the valve means is in the open state and are damped by means of a flow resistance generated when the fluid flows through the other communication passages which are not in the closed state with the valve means being switched to the closed state, a fluid dynamic damper effect to be described later has not completely been recognized.

Therefore, although a transmission of a particular frequency vibration through the apparatus is accidentally suppressed, transmissions of a plurality of vibrations having particular frequencies through the supporting apparatus cannot effectively be reduced.

In addition, since the valve means operated to switch between the open and closed states through the flow action of the fluid is used in the above-described supporting apparatus, an operation resistance of the valve means become increased and such a problem as sticking of the valve means in an intermediate position between the open and closed states occurs when a large external force is applied to the valve means which is derived from a load supporting or vibration inputs. Consequently, a smooth switching action of the valve means cannot be achieved.

The performance demanded for most effectively utilizing the apparatus for supporting the vibrating object of such a fluid sealing type will be described below before explaining the present invention.

The apparatus for supporting the vibrating object is required to have two functions simultaneously; a vibration prevention function for preventing a transmission of minute vibrations achievable by the reduction of a dynamic spring constant of a fluid dynamic damper and a vibration damping function for damping large vibrations achievable by an action of the fluid dynamic damper. The vibration prevention function required for the vibrating object supporting apparatus is achieved by a flow of an internal sealed fluid in the fluid chambers through communication passages along a vibration input direction so that the dynamic spring constant is reduced. The damping function also required for the apparatus is achieved by the fluid dynamic damper constituted by a fluid within the communication passages as a fluid mass and elasticity caused by the flow of the sealed fluid between the chambers and consequent expansion and constriction of the chambers as a fluid spring. Therefore, it is most effective for the apparatus to utilize both, so called, vibration prevention and vibration damping functions.

In a case where the fluid chamber is partitioned into two chambers and an orifice is provided for communicating both chambers, the fluid dynamic damper is formed on the basis of a fluid within the orifice and a resonant frequency F of the fluid dynamic damper is expressed as follows:

$$F = \frac{1}{2\pi} \sqrt{\frac{K}{M}}$$

wherein K denotes the fluid dynamic spring constant and M denotes an equivalent mass of a fluid within the orifice. The above-described equivalent mass of the fluid M is determined by an actual mass of fluid within the communication passages and by a relationship of a cross sectional area of the fluid chamber and a cross sectional area of the orifice.

In other words, the resonant frequency F can be varied if either or both of the fluid spring constant K and fluid mass within the communication passages are changed.

Therefore, it is an essential requirement for the performance imposed on the fluid-sealed type vibrating object supporting apparatus to enable an arbitrary setting state of the resonant frequency to suppress the plurality of vibrations and, in addition, to enable a smooth change of the resonant frequency under a strict environment of receiving strong vibration inputs.

SUMMARY OF THE INVENTION

With the above-described problems in mind, it is an object of the present invention to provide an apparatus for supporting a vibrating object which can achieve a smooth change of its resonant frequency to reduce the plurality of vibrations.

It is another object of the present invention to provide an apparatus for supporting a vibrating object which can arbitrary set the resonant frequency with simple construction.

The above-described objects can be achieved by providing an apparatus comprising: (a) a first fluid chamber located on a vibrating source and having at least one elastic wall thereof; (b) a second fluid chamber located on another object facing the vibrating source and having at least one elastic wall thereof; (c) a partitioning member disposed between the first and second fluid chambers; (d) a plurality of communication passages juxtaposed through the partitioning member for communicating the first and second chambers; and (e) means for opening and closing at least one of the communication passages according to a difference between vibration amplitudes of vibrations inputted thereto.

The above-described objects can be achieved by providing an apparatus comprising: (a) first means for supporting a vibrating object on another object, the first means having a resonant frequency; and (b) second means included in the first means for receiving an amplitude of a vibration from either of the objects and for operating to change the resonant frequency of the first means according to a difference in amplitude between the received vibrations thereof.

BRIEF DESCRIPTION OF THE PREFERRED EMBODIMENT

Reference will hereinafter be made to the drawings in order to facilitate understanding of the present invention.

The essential performance imposed on the apparatus for supporting the vibrating object has been described in the Description of the Prior Art.

Figure 1:
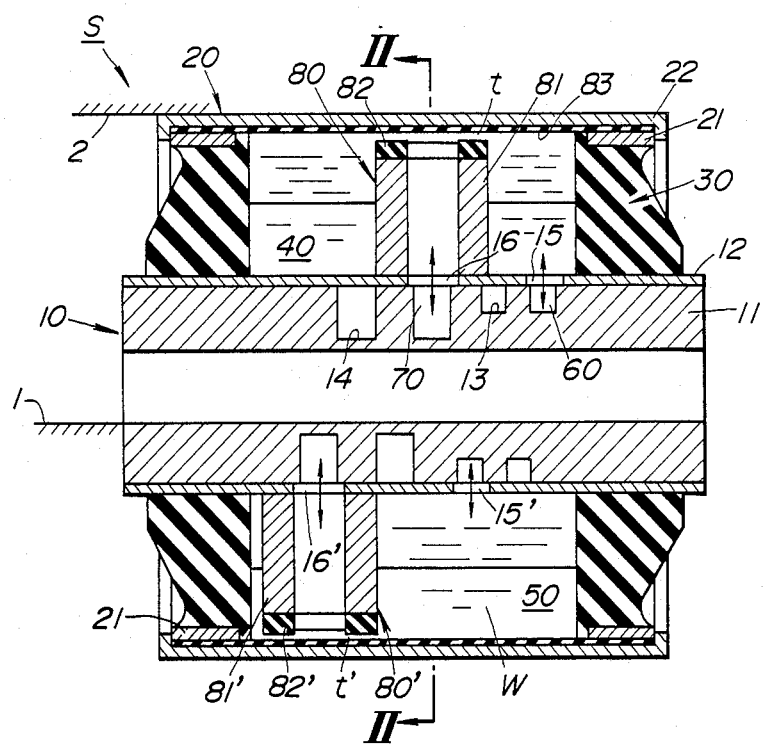
FIG. 1 is a cross sectional view of an apparatus for supporting a vibrating object in a preferred embodiment according to the present invention.
Figure 2:
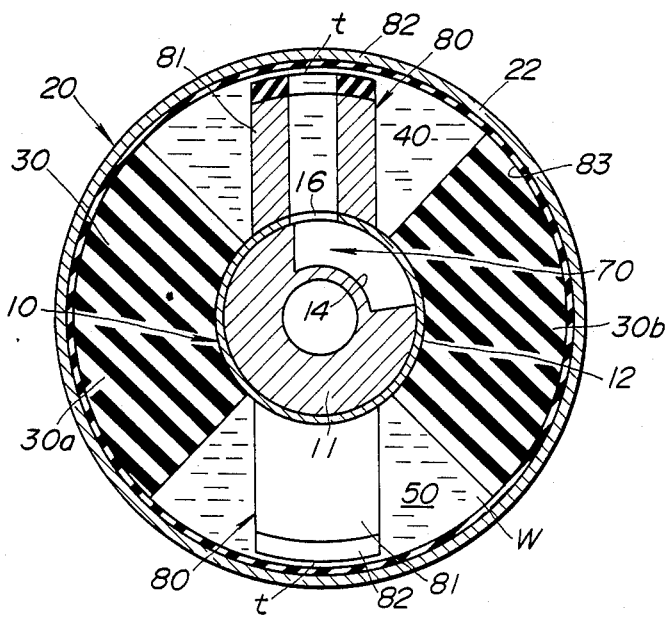
FIG. 2 is a longitudinal sectional view cut away along a line II—II in FIG. 1.

FIGS. 1 and 2 show a preferred embodiment according to the present invention.

The apparatus for supporting the vibrating object shown in FIGS. 1 and 2 is applicable to an apparatus for supporting a power unit mounted on an automotive vehicle.

The power unit supporting apparatus S is intervened between a vehicle body 1 and power unit 2. As shown in FIG. 1, the power unit supporting apparatus S includes an internal cylinder 10, an outside cylinder 20, elastic object 30, first fluid chamber 40, second fluid chamber 50, first communication passage 60, second communication passage 70, sealed fluid W, and opening/closing means 80, 80'. The individual elements will be described below.

Figure 3:
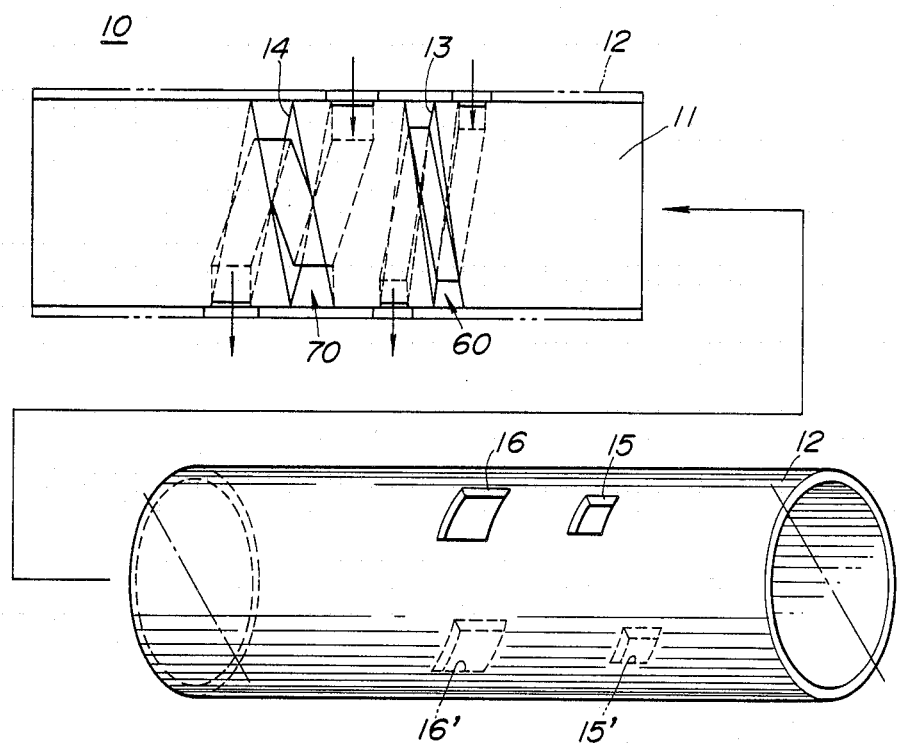
FIG. 3 is a perspective view of the vibrating object supporting apparatus indicating first internal cylinder 11 and second internal cylinder 12 shown in FIGS. 1 and 2.

The internal cylinder 10 is a cylindrical member fixed on the vehicle body 1 and comprises: a first internal cylinder 11; and a second internal cylinder 12 inserted along an outer periphery of the first internal cylinder 11 under pressure. The first internal cylinder 11 is formed with a first spiral groove 13 and second spiral groove 14 at its peripheral part as shown in FIG. 3, so that a first communication passage 60 and second communication passage 70 are formed with the second internal cylinder 12 inserted so as to block the grooves under pressure.

The second internal cylinder 12 is provided with first fluid holes 15, 15' at its peripheral part and second fluid holes 16, 16', the first and second fluid holes providing fluid flow ports for the first and second communication passages 60 and 70.

The outer envelope 20 is a cylindrical member fixed on the power unit 2 and is constituted by first outer envelopes 21, 21 in the form of rings to which the above-described elastic object 30 is adhered, a second outer envelope 22 covering the whole elastic object 30.

The elastic object 30 is vulcanized and adhered between the second internal cylinder 12 and first outer envelopes 21, 21. A first fluid chamber 40 and second fluid chamber 50 are formed within the elastic object 30, elastic object partitioning parts 30a, 30b and above-described circular cylinder 10 constituting a partitioning member.

The first communication passage 60 is formed with the above-described first fluid holes 15, 15' of the above-described internal envelope 10 constituting the partitioning member and first spiral groove 13. The first communication passage 60 is a spiral communication path having a long length of the passage and a small cross sectional area of flow passage.

The second communication passage 70 is, in turn, formed with the above-described second fluid holes 16, 16' constituting the partitioning member and second spiral groove 14. The second communication passage 70 is a spiral communication path having a long length of the passage and a large cross sectional area of the flow passage. It is noted that the first communication passage 60 and second communication passage 70 are installed so as to communicate between the first fluid chamber 40 and second fluid chamber 50.

Such a noncompressible fluid as a nonfreezing solution is used as the sealed fluid W which has been sealed into both of the above-described fluid chambers 40, 50 and both communication passages 60, 70.

The open/close means 80, 80' provides means for opening the above-described second communication passage 70 when an idling vibration input occurs and means for closing the second communication passage 70 when an engine shaking vibration input occurs. In this embodiment, the open/close means 80, 80' includes introduction envelopes 81, 81', stop rubber members 82, 82', and rubber film 83. The introduction envelopes 81, 81' are installed at positions of the above-described second fluid holes 16, 16' so as to project toward the inner surface of the second outer envelope 22. The projecting ends of the introduction envelopes 81, 81' are baked with the stop rubber members 82, 82', respectively.

The rubber film 83 is baked to the inner surface of the second outer envelope 22. Clearances t, t' between the rubber film 83 and stop rubber members 82, 82' under a static weight supporting condition have slightly smaller lengths than those of the vibration amplitudes of the engine shaking vibration such that both stop rubber member 82 (or 82') and rubber film 83 are not brought in contact with each other when the idling vibration input occurs and such that they are brought in contact with each other when the engine shaking vibration input occurs. The amplitude remaining after both rubber members 82 (or 82') and 83 are contacted with each other is absorbed through an elastic deformation thereof.

The resonant frequency is set in the following way by a utilization of flow of the sealed fluid W within the first communication passage 60 and second communication passage 70.

In general, the resonant frequency F of the fluid dynamic damper can be expressed as follows:

$$F = \frac{1}{2\pi} \sqrt{\frac{K}{M}} \tag{1}$$

wherein K denotes the fluid spring constant and M denotes an equivalent mass of fluid within a communication passage.

Figure 4:
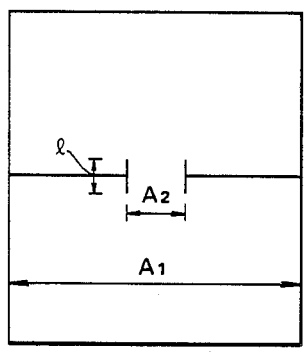
FIG. 4 is a model view for explaining the setting of a resonant frequency of a fluid dynamic damper.

The fluid equivalent mass M within the communication passage can be expressed as follows with reference to FIG. 4:

$$M = m \times \left(\frac{A_1}{A_2}\right)^2 \tag{2}$$

wherein m denotes an actual mass of the sealed fluid, $A_1$ denotes a cross sectional area of the fluid chamber, and $A_2$ denotes a cross sectional area of the communication passage.

In addition, the sealed fluid mass m can be expressed as follows:

$$m = \rho \times A_2 \times l \tag{3}$$

wherein $\rho$ denotes a specific gravity of the sealed fluid and l denotes a length of the communication passage.

When the equations (2) and (3) are substituted into the equation (1), the following equation is established.

$$F = \frac{1}{2\pi} \times \sqrt{K} \times \frac{A_2}{\sqrt{\rho \times l \times A_1^2}} \tag{4}$$

If the length of the communication passage l, cross sectional area $A_1$ of the fluid chamber, and fluid spring constant K are constant, the following equation is established.

$$F = \alpha \times A_2 \tag{5}$$

wherein $\alpha$ denotes a constant.

In other words, if the cross sectional area $A_2$ of the communication passage is enlarged, the resonant frequency F is increased.

Figure 5:
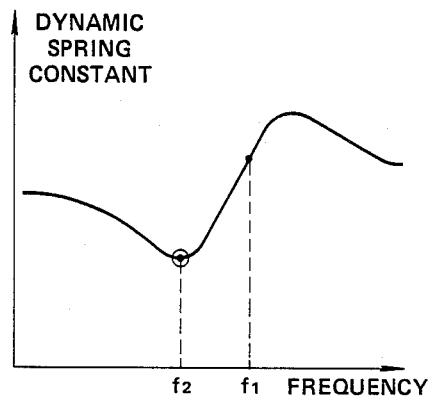
FIG. 5 is a characteristic graph of a dynamic spring constant with respect to frequency at a time when the vibrating object supported by the apparatus shown in FIGS. 1 and 2 is in an idling operating state.

Hence, in the idling operating state the open/close means 80, 80' constituting the apparatus in the embodiment is left open and the cross sectional area of the flow passage is achieved by the sum of the two communication passages 60, 70. Consequently, the resonant frequency $f_1$ is increased so that the frequency $f_2$ at which the dynamic spring constant is lowest and which appears on a slightly lower frequency band than the resonant frequency $f_1$ coincides with approximately 25 Hertz which is a frequency of a second harmonic component of the engine revolution speed at the time of engine idling state, as shown in FIG. 5.

In addition, when the engine shaking vibration input occurs, the open/close means 80, 80' is closed in response to a vibration amplitude of the engine shaking vibration. The cross sectional area of the flow passage is derived from only the first communication passage 60. Consequently, the resonant frequency $f_1'$ is settable approximately to 11 Hertz which is a frequency of the engine shaking vibration generated during vehicle running, as shown in FIG. 6(B).

If the ratio of cross sectional area of flow passage at the time of engine idling state and at the time of engine shaking is set approximately to 1:6, the apparatus can set the resonant frequency at the above-described two points.

Next, the operation of the preferred embodiment will be described below.

(A) Idling

When the engine is in the idling state after the engine starts, the vibration amplitude of the idling vibration is smaller than each of the clearances t, t' and the open/close means 80, 80' are left open.

Since, when the open/close means 80, 80' is in the open state, the frequency $f_2$ at which the dynamic spring constant is lowest coincides approximately with the frequency band (approximately 25 Hz) of the second harmonic component of the engine revolution speed at the time of the engine idling state, the idling vibration can be reduced by having a vibration prevention function caused by the reduction of the dynamic spring constant.

It should be noted that a high vibration prevention function with a large reduction of the dynamic spring constant can be achieved by the large flow passage cross sectional area of both communication passages 60, 70 and by the increased fluidity when the sealed fluid W passes through both communication passages 60, 70.

In addition, such a vibration input as the vibration frequency equal to or more than 25 Hz and falling within the frequency band including a frequency higher or lower than the resonant frequency $f_1$ can be damped through the vibration damping function caused by the action of the fluid dynamic damper when the engine is in the idling state.

(B) Engine Shaking

When the engine shaking vibration having a frequency slightly higher or lower than the vibration frequency of 11 Hz occurs, the vibration amplitude of the engine shaking vibration is larger than the length of each clearance t, t'. The open/close means 80, 80' located on the first fluid chamber 40 and second fluid chamber 50 are alternatingly closed according to the vibration amplitude. Although in such an alternate close and open state the second communication passage 70 is temporarily open while one of the open/close means 80, 80' is closed (or open) and simultaneously the other open/close means 80, 80' is open (or closed), the sealed fluid W does not reciprocate within the second communication passage 70 due to the closing action of the open/close means so that the action of the dynamic damper is not achieved by means of the second communication passage 70.

Since the resonant frequency $f_1'$ set through the sealed fluid W moving within the first communication passage 60 coincides approximately with the engine shaking vibration frequency (about 11 Hz) when the open/close means 80, 80' is closed, the engine shaking vibration can be damped with the damping function caused by the fluid dynamic damper action.

Figure 6A:
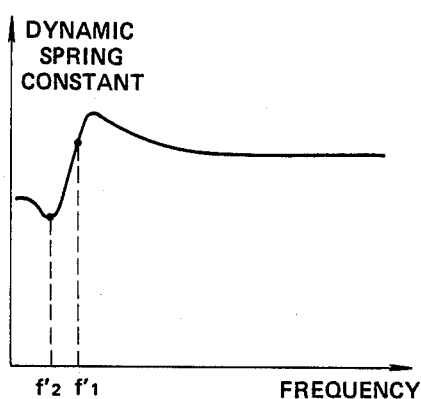
FIGS. 6(A) and 6(B) are characteristic graphs of the dynamic spring constant and damping force at a time when the vibrating object and supporting apparatus therefor are in a running state.
Figure 6B:
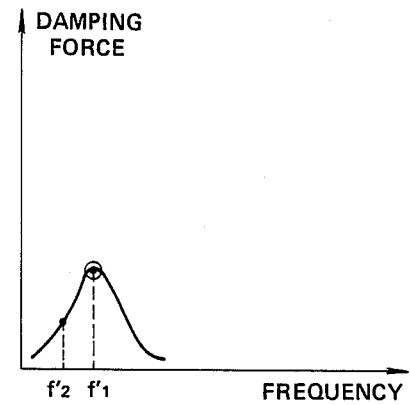

In addition, when the vehicle runs, the vibration input having a frequency slightly higher or lower than the frequency $f_2'$ below 11 Hertz can be damped with the damping function provided due to the reduction of the dynamic spring constant as shown in FIG. 6(A).

In this way, since the open/close means 80, 80' in the power unit supporting apparatus S of the preferred embodiment provides means for spontaneously operating according to an amplitude difference of the input vibration and, in other words, provides means for directly utilizing the vibration-responsive operation caused by the input vibration, such movable members operating by external forces as valves are not required, and accurate, smooth opening and closing operation can be achieved with simple construction and economy.

Furthermore, a fine tuning of the resonant frequency can easily be carried out by setting of the cross sectional areas of both communication passages 60, 70.

Although the power unit supporting apparatus in the cylindrical bushing construction has been described in the preferred embodiment, the present invention is applicable to supporting apparatus having a construction other than the preferred embodiment such as a power unit supporting apparatus in which the elastic object is adhered between plates.

In addition, although in the preferred embodiment the two communication passages are provided and the cross sectional areas thereof are stepwise changed to change the resonant frequency, the apparatus according to the present invention may have three or more communication passages and may change the lengths of the communication passages in place of a change of the cross sectional area.

Although the power unit supporting apparatus in the preferred embodiment reduces the idling and engine shaking vibrations, the present invention is also applicable to a power unit supporting apparatus which reduces the vibrations other than those in the preferred embodiment.

Since as described hereinabove the vibrating object supporting apparatus according to the present invention has a plurality of communication passages communicating between first and second fluid chambers in parallel to each other and open/close means for opening and closing at least one communication passage among the plurality of communication passages, different resonant frequencies can be set according to the open state and closed state of the corresponding communication passage. Consequently, the plurality of vibrations can effectively be reduced by the utilization of the vibration prevention function provided by the reduction of the dynamic spring constant and the damping function provided by the action of fluid dynamic damper.

In addition, since the above-described open/close means provides means for spontaneously operating according to an amplitude difference of the input vibrations, in order words, means for directly utilizing the vibration-responsive operation caused by the input vibrations, accurate and smooth opening and closing operations can be achieved without requiring such movable members as valves.

It will clearly be understood by those skilled in the art that the foregoing description is made in terms of the preferred embodiment, and various changes and modifications may be made without departing from the scope of the present invention which is to be defined by the appended claims.

What is claimed is:

1. An apparatus comprising:
   (a) a first fluid chamber located on a vibrating source and having at least one elastic wall thereof;
   (b) a second fluid chamber located on another object facing the vibrating source and having at least one elastic wall thereof;
   (c) a partitioning member disposed between the first and second fluid chambers;
   (d) a plurality of communication passages juxtaposed through the partitioning member for communicating the first and second chambers each of said passages containing a constant fixed volume; and
   (e) means for opening and closing at least one of the communication passages in response to a difference between vibration amplitudes of vibrations inputted thereto.

2. The apparatus according to claim 1, wherein the vibrating source is a power unit and the other object is a vehicle body and wherein the opening and closing means opens the communication passage so that total cross sectional areas of fluid flow passage in the communication passages are increased when the power unit is an idling state.

3. The apparatus according to claim 2, wherein a resonant frequency of the apparatus is increased when the opening and closing means opens the communication passage, to define a frequency at which a dynamic spring constant of the apparatus is the lowest and which appears in a frequency range slightly lower than the resonant frequency, said defined frequency coinciding approximately with a frequency of a second harmonic component of an engine revolution speed at the time of engine idling.

4. The apparatus according to claim 1, wherein the vibrating source is a power unit and the other object is a vehicle body and wherein the opening and closing means closes the communication passage so that total cross sectional areas of fluid flow passage in the communication passages are decreased when the vehicle is running.

5. The apparatus according to claim 4, wherein the resonant frequency of the apparatus is decreased when the opening and closing means closes the communication passage to provide a resonant frequency thereof at this time approximately matching a frequency of an engine shaking vibration generated when the vehicle is running.

6. The apparatus according to claim 5, wherein vibrations having frequencies below the engine shaking vibration frequency are damped by the reduction of dynamic spring constant when the vehicle is running.

7. An apparatus comprising:
   (a) a first fluid chamber located on a vibrating source and having at least one elastic wall thereof;
   (b) a second fluid chamber located on another object facing the vibrating source and having at least one elastic wall thereof;
   (c) a partitioning member disposed between the first and second fluid chambers;
   (d) a plurality of communication passages juxtaposed through the partitioning member for communicating the first and second chambers each of said passages containing a constant fixed volume; and
   (e) means for opening and closing at least one of the communication passages in response to a difference between vibration amplitudes of vibrations inputted thereto, wherein said opening and closing means comprises a first envelope installed within the first fluid chamber and projected from a fluid port of the communication passage, the projected end thereof having a rubber member and having a clearance against the elastic wall of the first fluid chamber and a second envelope installed within the second fluid chamber and projected from a fluid port of the communication passage, the projected end thereof having a rubber member and having the same clearance against the elastic wall of the second fluid chamber.

8. The apparatus according to claim 7, wherein the vibrating source is a power unit of a vehicle and the other object is a vehicle body and wherein each clearance between the first envelope and elastic wall of the first fluid chamber and between the second envelope and elastic wall of the second fluid chamber is set to a length slightly smaller than an amplitude of the vibration caused by engine shaking of the power unit during engine running.

9. The apparatus according to claim 7, wherein each communication passage is substantially in a spiral form having a long passage length.

10. An apparatus comprising:
(a) first means for supporting a vibrating object on another object, the first means having a resonant frequency; and
(b) second means included in the first means for receiving an amplitude of a vibration from either of the objects and for spontaneously changing the resonant frequency of the first means in response to a difference in amplitude between the received vibrations thereof.

11. The apparatus according to claim 10, wherein said second means increases the resonant frequency when the amplitude of the received vibration is below a preset level.

12. The apparatus according to claim 10, wherein the first means comprises:
(a) a first fluid chamber located on the vibrating object and having at least one elastic wall part thereof;
(b) a second fluid chamber located on the other object and having at least one elastic wall thereof;
(c) a partitioning member disposed between the first and second fluid chambers; and
(d) a plurality of passages juxtaposed through the partitioning member for communicating both first and second fluid chambers.

13. The apparatus according to claim 12, wherein the second means comprises means for opening and closing at least one of the communication passages according to the difference in amplitude between the received vibrations thereof so that a cross sectional area of flow passage of the passages is changed.

14. The apparatus according to claim 12, wherein the second means comprises means for changing a length of passage of at least one of the communication passages according to the difference in amplitude between the received vibrations thereof.

15. An apparatus according to claim 1, wherein said opening and closing means automatically opens and closes the ends of one of said passages in response to a difference in said vibration amplitudes.

* * * * *